United States Patent [19]

Nakanishi

[11] Patent Number: 5,042,934
[45] Date of Patent: Aug. 27, 1991

[54] EYEGLASSES HAVING SPECIAL CONNECTIONS

[75] Inventor: Eiichi Nakanishi, Ashiya, Japan

[73] Assignee: Nakanishi Optical Co., Ltd., Osaka, Japan

[21] Appl. No.: 587,565

[22] Filed: Sep. 24, 1990

Related U.S. Application Data

[63] Continuation of Ser. No. 328,816, Feb. 24, 1989, abandoned, which is a continuation of Ser. No. 96,409, Sep. 15, 1987, abandoned.

[30] Foreign Application Priority Data

Oct. 2, 1986 [JP] Japan .......................... 61-151945[U]

[51] Int. Cl.⁵ .......................... G02C 5/02; G02C 5/00
[52] U.S. Cl. .................................... 351/124; 351/41; 351/140; 351/144
[58] Field of Search .......................... 351/41, 90-102, 351/104, 124, 140, 144, 133, 121, 132, 87

[56] References Cited

U.S. PATENT DOCUMENTS

| | | | |
|---|---|---|---|
| 440,064 | 11/1890 | Schneiber | 351/133 |
| 989,218 | 4/1911 | Wells | 351/95 |
| 2,261,525 | 9/1939 | Rips | 351/140 X |
| 3,304,145 | 2/1967 | Hamm | 351/140 X |

FOREIGN PATENT DOCUMENTS

| | | | |
|---|---|---|---|
| 3503644 | 4/1986 | Fed. Rep. of Germany | 351/140 |
| 536688 | 5/1922 | France | 351/140 |

Primary Examiner—Rodney B. Bovernick
Attorney, Agent, or Firm—Edgar H. Haug; John M. Kilcoyne; Curtis, Morris & Safford, P.C.

[57] ABSTRACT

A glasses with bridges and temples which are fixed to lens frames, without depending upon deposition. Bridges and temples of this glasses can be changed easily according to one's taste because they are not deposited to lens frames but are fixed to lens frames through the medium of sleeves and other means.

2 Claims, 1 Drawing Sheet

FIG. 1
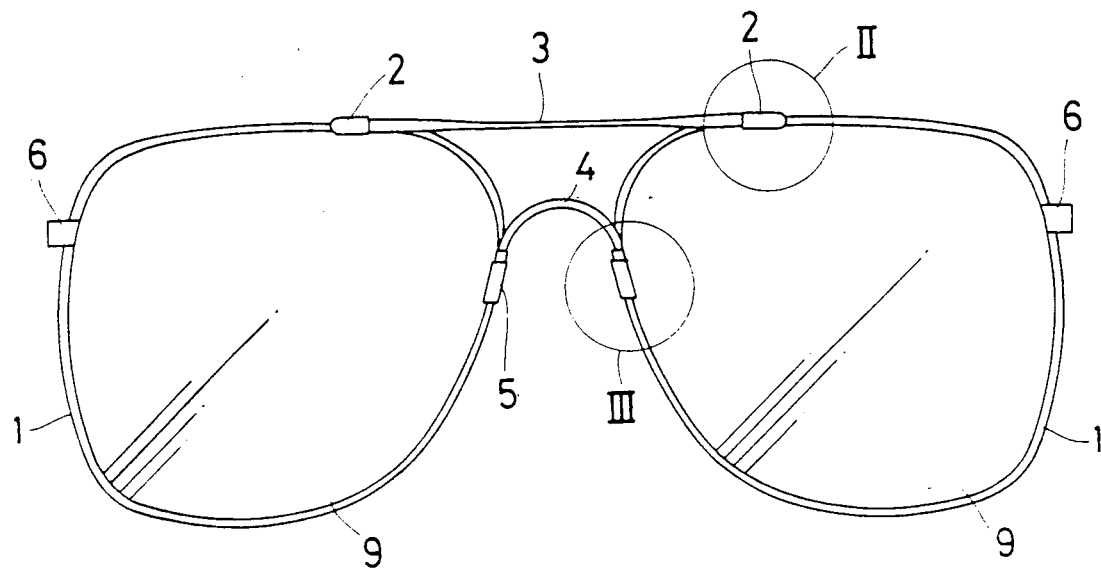
FIG. 2
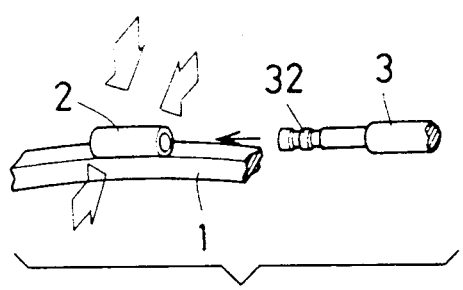
FIG. 3(A)    FIG. 3(B)
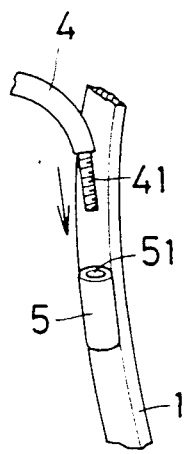
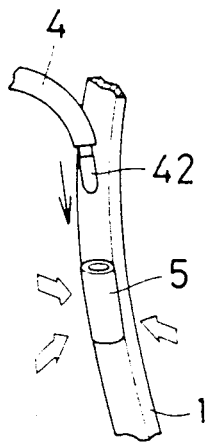
FIG. 4
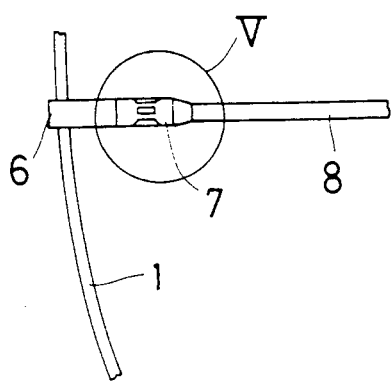
FIG. 5
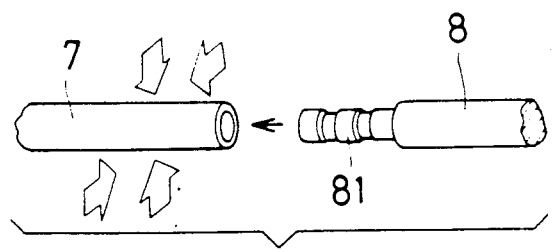

5,042,934

EYEGLASSES HAVING SPECIAL CONNECTIONS

This application is a continuation of now abandoned application Ser. No. 07/328.816 filed on Feb. 24, 1989, which was a continuation of Ser. No. 07/096,409, now abandoned, filed Sept. 15, 1987.

BACKGROUND OF THE INVENTION

1. Field of the invention

This invention relates to glasses with parts, such as a bridge between two lens frames, temples, etc., which can be fixed firmly without depending upon the material themselves for attachment.

2. Prior art

In the conventional glasses, two lens frames with the required space left therebetween are connected by one or two bridges and each of the temples is fixed foldably to an end piece provided at the outer side of lens frames. These lens frames, brigdes, end pieces etc. are welding fixed together by deposition.

With the development of high-fashioned glasses in recent years, in some cases each part of the glasses is made of different materials. However, in making each part of glasses with different materials, it is required that such materials must be welded to each other and therefore materials which cannot be welded are not usable even if they are excellent in quality and designability.

The present invention has for its object to provide glasses with parts which are fixable to each other, irrespective of whether their materials are weldable or not.

SUMMARY OF THE INVENTION

Glasses according to the present invention comprises two lens frames, two lenses, two temples, sleeves and end pieces, of which at least the lens frames, sleeves and end pieces are formed with weldable materials. The two lens frames have sleeves at the upper part and the inner side thereof. A bridge and a U-shaped bridge are laid between and fixed to the opposite sleeves. A base end portion of each temple is fitted in and fixed to a sleeve provided at an end of an end piece. Thus, parts formed with materials which cannot be welded are fixable, without depending upon welding.

BRIEF DESCRIPTION OF THE DRAWINGS

The drawings show an embodiment of the glasses according to the present invention, in which:

FIG. 1 is a front view of the whole glasses according to the present invention;

FIG. 2 is an explanatory drawing showing a method of fixing together a bridge and a sleeve;

FIG. 3 (A) and 3 (B), are explanatory drawings showing different methods of fixing U-shaped bridge;

FIG. 4 is a side view of the temple fixing portion; and

FIG. 5 is an exploded view of the structure of FIG. 4.

DETAILED DESCRIPTION OF THE INVENTION

A description is given below of the glasses according to the present invention on the basis of an embodiment shown in the drawing.

In the drawing, numerals, 1 designate two lens frames. The shape of the lens frame 1 is not limited to that shown in FIG. 1 but any shape and any design can be adopted for the lens frame. The desired lens 9 is set in each lens frame 1. Numeral 2 designates a hollow sleeve welded to the upper part of each lens frame 1. These sleeves 2 are provided on each lens frame 1 n such a fashion that they oppose each other. An upper bridge element 3 is of either cylinder from or pipe form and both ends thereof are fixed in each sleeve 2.

As shown in FIG. 2, an end portion 32 of the bridge element 3 is fitted in the sleeve 2 and then the sleeve 2 is pressed from the outside to deform it for holding the end portion 32 in the sleeves.

A nose bridge element 4 of U-shaped curve to be laid between two lens frames 1. 1 are fixed to the lens frames as shown in FIG. 3 (A), and 3 (B). As to the method of fixing shown in FIG. 3 (A), a blot 41 provided at the top end of the U-shaped nose bridge element 4 is fitted in the sleeve 5 and then the sleeve 5 is pressed from the outside to deform it for fixing the blot 41 in sleeve 5. With regard to the method of fixing shown in FIG. 3 (B), a fitting rod provided at the top end of the U-shaped nose bridge element 4 is fitted in the sleeve 5.

As to the fitting of a temple 8, as shown in FIG. 4, a sleeve 7 is provided at the outer end of an end piece 6. After a base end 81 of the temple 8 is inserted in the sleeve 7, the sleeve 7 is pressed from the outside to deform it for fixing the temple therein. The lens frame 1 and the sleeve 2, 5, and piece 6 may be made of different material but should be made of material which can be welded to each other. The sleeves 2, 5, 7 are fixed beforehand to the lens frame 1, and the bridge elements 3, 4 and the temples 8 are fixed to these sleeves. Therefore, the bridge elements and the temples may be made of either weldable material or material which cannot be welded.

According to the present invention, at least lens frames 1, sleeves and end pieces are formed with weldable, material, sleeves are provided at the upper part and at the inner side of two lens frames, a bridge element and a U-shaped nose bridge element are laid between opposite sleeves, the bridge element and the sleeves are fixed together, and a base end of the temple is fitted in and fixed to a sleeve provided at an end of an end piece. Thus, fixation between parts, such as lens frame, bridge elements, temple, etc., can be done accurately, even in the case where parts cannot be welded to each other. Moreover, temples and bridge elements can be changed easily according to one's taste.

What is claimed is:

1. A frame for glasses, comprising:

two lens frames side by side each having a bridge element receiving sleeve integrally secured directly to the top thereof and a nose bridge element receiving sleeve integrally secured directly to the inner portion of the lens frames where they are in spaced opposed relation, and an end piece secured directly on the outer portion of said lens frames on the opposite side therefrom the nose bridge element receiving sleeve and said end piece having a temple receiving sleeve pivotally mounted thereon, said lens frames and said receiving sleeves and said end pieces being of materials which can be integrally joined by welding;

an upper bridge element, a nose bridge element and a pair of temples, each being of a material other than a material which can be joined to said lens frames by welding said upper bridge element extending between the two bridge element receiving sleeves with the ends of the upper bridge element within the bridge element receiving sleeves and the bridge element receiving sleeves being deformed for securing the ends of the upper bridge element therein;

said nose bridge element extending between the two nose bridge element receiving sleeves with the ends of the nose bridge element within the nose bridge element receiving sleeves and the nose bridge element receiving sleeves being deformed for securing the ends of the nose bridge element therein; and each temple having a forward end engaged in a corresponding temple receiving sleeve with the temple receiving sleeve being deformed for securing the end of the temple therein.

2. A frame for glasses, comprising:

two lens frames side by side each having a lens therein and having a bridge element receiving sleeve integrally secured directly to the top thereof and a nose bridge element receiving sleeve integrally secured directly to the inner portion of the lens frames where they are in spaced opposed relation, and an end piece secured directly on the outer portion of said lens frames on the opposite side therefrom from the nose bridge element receiving sleeve and said end piece having a temple receiving sleeve pivotally mounted thereon, said lens frames and said receiving sleeves and said end pieces being of materials which can be integrally joined by welding;

an upper bridge element, a nose bridge element and a pair of temples, each being of a material other than a material which can be joined to said lens frames by welding;

said upper bridge element extending between the two bridge element receiving sleeves with the ends of the upper bridge element within the bridge element receiving sleeves and the bridge element receiving sleeves being deformed for securing the ends of the upper bridge element therein;

said nose bridge element extending between the two nose bridge element receiving sleeves with the ends of the nose bridge element within the nose bridge element receiving sleeves and the nose bridge element receiving sleeves being deformed for securing the ends of the nose bridge element therein; and each temple having a forward end engaged in a corresponding temple receiving sleeve with the temple receiving sleeve being deformed for securing the end of the temple therein.

* * * * *